Al coating  
Fe-Al layer  
Steel core

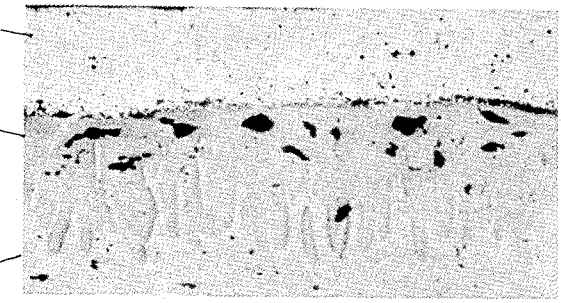
Fig. 1. Al coating; Fe-Al layer; Steel core. Coated with 99.9% Al at 1350°F for 40 seconds
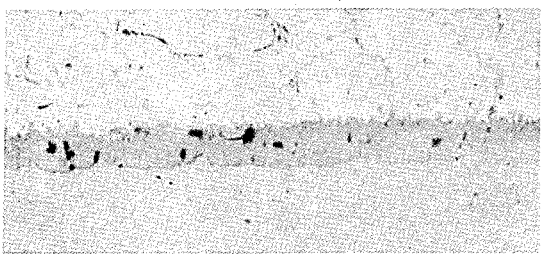
Fig. 2. Al-2% Si alloy at 1350°F for 40 seconds
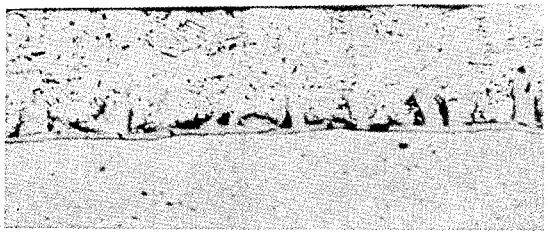
Fig. 3. Al-8% Si alloy at 1350°F for 40 seconds
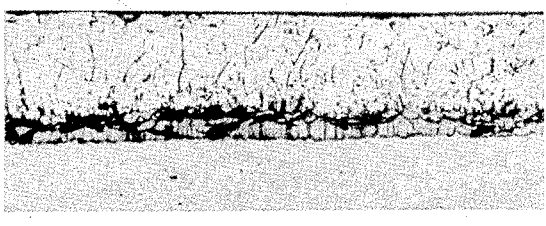
Fig. 4. Al-2% Be alloy at 1350°F for 25 seconds
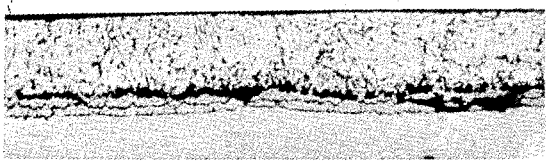
Fig. 5. Al-27% Be alloy at 1350°F for 25 seconds
INVENTOR
JAMES B. RUSSELL
BY James E. Toomey
ATTORNEY April 28, 1959 J. B. RUSSELL 2,883,739
COMPOSITE ARTICLE
Filed April 11, 1951 2 Sheets-Sheet 2

Coated with Al-4.16% Si-.03% Be alloy at 1300°F for 20 seconds

Al-3.18% Si-.1% Be alloy at 1300°F for 20 seconds

Al-2.12% Si-.2% Be alloy at 1300°F for 20 seconds

Al-2.28% Si-.25% Be alloy at 1300°F for 20 seconds

INVENTOR  
JAMES B. RUSSELL  
BY James E. Toomey  
ATTORNEY

United States Patent Office 2,883,739
Patented Apr. 28, 1959

2,883,739

COMPOSITE ARTICLE

James B. Russell, Spokane, Wash., assignor to Kaiser Aluminum & Chemical Corporation, Oakland, Calif., a corporation of Delaware Application April 11, 1951, Serial No. 220,425

9 Claims. (Cl. 29—196.2)

This invention relates to aluminum alloys particularly adapted for the coating of ferrous metals. More particularly, and in addition, the invention relates to improved composite articles of ferrous metals coated with aluminum alloys, to the molten baths of aluminum alloys for coating the ferrous metals, and to a hot-dip process for producing the composite articles.

More specifically, the invention relates to composites of ferrous metals coated with aluminum alloys by the hot-dip method or by any other method in which molten aluminum or aluminum alloy may be applied characterized by improved adherence and ductility accomplished through reduction of the thickness and preferably with modification of the microstructure of the iron-aluminum intermetallic compound layer formed between the coating proper and the core metal.

Coatings of aluminum on iron and steel products are highly desirable, since the composites resulting in effect embody the superior properties resident in each metal. To the strength and other desirable characteristics of the iron or steel core, the aluminum coating adds the more salient properties of resistance to corrosion and oxidation at both atmospheric and elevated temperatures, enhanced electrical conductivity, improvement in the facility of brazing and soldering of aluminum to steel, and more attractive appearance.

In manufacturing processes and other applications in which it is found desirable or necessary to use mill products such as wire, sheet and strip in the aluminized (coated with aluminum or aluminum-rich alloys) or galvanized condition, it is often necessary, due to the nature of forming operations, that said composites have a high degree of ductility, i.e., that the protective metallic coatings be able to withstand high degrees of deformation without cracking or spalling. However, the production of "aluminized" (aluminum-coated) ferrous articles has presented many problems particularly with regard to coating by the hot-dip process. Among the principal difficulties encountered have been the lack of satisfactory adherence of the coating to the basis metal, and lack of ductility of the coating. These deficiencies seriously interfere with the formability of the composite in regard to subsequent working, and also lead to unsatisfactory "in service" performance of the product due to cracking, peeling or flaking of the coating when the composite article is bent or otherwise deformed.

It has been determined that the lack of adherence and ductility with resultant cracking and spalling tendency of the coating is in a large measure attributable to the thickness of the hard brittle Fe-Al phase layer, an intermediate layer formed between the core and the superimposed or outer layer of the aluminum-rich coating metal. This interfacial layer, which may be considered as a part of the coating as opposed to the iron or steel core, is formed by diffusion principally occurring during immersion of the basis metal in the bath of molten coating metal. This mechanism creates the bond between the metals. The final thickness of the interfacial layer is a function of the temperature of coating bath and the time-at-temperature. With sufficient immersion time, a steel or iron strip would be entirely converted to brittle Fe-Al phases. Likewise, when an aluminized composite is maintained at a sufficiently high temperature (below the melting point of aluminum) for a sufficient length of time, the entire aluminum coating will be transformed to essentially Fe-Al phases by solid-state diffusion. As a consequence, previous attempts to produce aluminum-coated ferrous metal articles by the hot-dip process, which is particularly adapted to continuous coating of such articles as wire, strip and sheet, have in general resulted in composites not wholly satisfactory and exhibiting serious deficiencies, particularly in adherence and ductility.

It has long been known that the addition of silicon in relatively large amounts to the molten aluminum coating bath alters the character of the iron-aluminum alloy layer, thereby increasing ductility and adherence of the composite. However, due to the amounts of silicon required to produce this desired effect, the lustre of the coated article is diminished (as compared with high purity or commercially pure aluminum), and a roughening of the surface occurs which further detracts from the appearance of the coating. In addition, the excessive amounts of Si constituent accompanying the high silicon content decreased the ductility of the aluminum coating layer superimposed on the Fe-Al layer. Accordingly, the difficulties in production of hot-dipped aluminum-coated ferrous articles have not been wholly or successfully obviated.

It is, therefore, a primary object and purpose of the present invention to provide aluminum base alloys particularly adapted for coating ferrous articles and to provide composite articles of ferrous metals coated with such alloys characterized by improved adherence and ductility combined with excellent appearance including good lustre, and smooth, even fine-grained texture.

A further object is to provide coating baths for coating ferrous metal articles comprising molten aluminum base alloys having improved operational characteristics such as resistance to oxidation and consequently minimum oxide film thickness and bright surfaces. Another object is to provide a process for the production of improved aluminum-coated ferrous metal articles employing the aluminum base coating alloys of the invention.

It is a specific object of this invention to provide an economical and feasible means for reducing the thickness of the brittle interfacial layer formed during the aluminizing of iron and steel by hot-dip methods or by any other method in which molten aluminum or aluminum alloy may be applied, and to reduce the rate of formation of said interfacial alloy layer during subsequent exposure of composites to heat.

These and other objects and advantages of the invention will become apparent from the following detailed description thereof.

It has been discovered that aluminum base alloys containing combinations of beryllium and silicon in specified amounts are particularly effective as coating alloys for the production of aluminum-coated ferrous articles. These alloys may be ternary or more complex alloys containing certain other alloying elements which improve certain characteristics of the coatings or composite articles, as well as permissible amounts of other elements which do not have any substantial adverse effect on the improved characteristics imparted by the combined presence of beryllium and silicon.

In particular, it has been found that beryllium in advantageously small amounts, although far in excess of those normally used in aluminum alloys, greatly reduces the thickness of the Fe-Al phase or interfacial layer and the reduced layer appears to be softer resulting in excellent adherence and ductility characteristics of the composite. The effect of beryllium in this regard is about fifteen to over twenty times that of silicon on a weight basis within the recommended ranges of amounts of beryllium.

Beryllium retards oxidation of the coating alloy in both the molten bath and the solid state. This retardation exerts a pronounced favorable influence on the operational characteristics of the molten metal bath. As a result of retarded oxidation in the solid state, the beryllium alloy imparts a higher lustre in the as-coated condition as compared to 99.9% aluminum or commercially pure aluminum, whereas silicon, when used alone particularly in the higher amounts to produce adherence and ductility properties comparable to those produced by beryllium additions, causes a dulling of the coating which takes on a steel gray color.

The presence of silicon in the coating alloys of the invention not only acted in conjunction with the beryllium to further reduce the thickness and hardness of the Fe-Al interfacial layer, but produced an additional significant increase in the overall appearance of the composite. The effect is believed to result from an increased fluidity of the melt which in turn produced a thinner Al-Si-Be alloy surface layer or coating. Thus, the presence of silicon provides better coverage and control of the total thickness of the coating.

Although the silicon decreased somewhat the high lustre of the coating obtained by the presence of beryllium, this disadvantage was more than outweighed by the improvement resulting in surface texture, particularly compared with binary alloys containing beryllium in the higher amounts within the recommended range which exhibited a large-grained mottled appearance in the as-coated state on mild steel and iron strip.

Thus, the combination of silicon with beryllium, in addition to being characterized by optimum adherence and ductility, produced smooth even coatings of fine-grained surface texture. This latter result is unique in view of the fact that silicon alone, particularly in the higher amounts, inherently gives relatively rough coatings of unattractive gray appearance, while the coatings with beryllium alone in higher amounts are of large-grained mottled appearance, although of high lustre.

In addition, another beneficial effect of silicon in combination with beryllium with respect to microstructure of the Fe-Al alloy layer has been noted. Improved overall ductility of the coating is obtained, particularly in the lower ranges of amount of beryllium, over and above the cumulative effect of beryllium and silicon in reducing Al-Fe layer thickness. This advantage is discussed in detail below with reference to the photomicrographs in the drawings.

Accordingly, when these two alloying constituents are present in certain ranges of amounts, they have a combined action such that the silicon content obviates the disadvantages attendant with the binary Al-Be alloy, and conversely, the beryllium content tends to offset the shortcomings exhibited with the use of the binary Al-Si alloy.

The amounts of the beryllium and silicon may be varied while obtaining the excellent results produced by the combination. The beneficial effect of the beryllium in reducing the thickness and hardness of the Fe-Al layer becomes pronounced to the extent that significant increase in ductility results when about 0.15% Be by weight of the alloy is present in the Al-Be binary alloy. The Fe-Al layer is reduced well over 50% in thickness with this beryllium content. Increasing amounts up to about 0.4 to 0.7% further reduce the interfacial layer thickness up to as much as about 90%, but further additions of beryllium as high as 1.5% show slight improvement in this regard. Accordingly, although 0.7% is not to be construed as an upper limit and amounts as high as 1.5% are included, the advantage gained by further increasing the amount of beryllium over 0.7% probably would not justify the increase in cost. Also, amounts of beryllium of about 0.4% or over detract from the surface appearance of the coating by forming a large-grained mottled effect. However, as indicated above, this disadvantage is offset by the presence of silicon in proper amounts.

It is a distinct advantage of the invention that from the standpoint of operational characteristics of the molten coating metal, appearance of the coating and even ductility thereof very satisfactory results are obtainable with amounts of beryllium as low as about 0.03% when silicon is also present in the aluminum base alloy in appropriate amounts.

Accordingly, the amounts of beryllium embraced by the invention may advantageously be from about 0.03 to about 1.5% while from the point of view of the optimum adherence, ductility and appearance of the composites together with most satisfactory bath characteristics the preferred range is from about 0.10 to about 0.4% Be.

The silicon content of the alloys embraced by the invention and productive of eminently satisfactory results is from about 1.0 to about 5%, amounts substantially in excess of the latter figure being found detrimental to the overall ductility of the composite.

Optimum results are obtained when the beryllium content is from 0.1 to 0.3% with silicon from 1 to 4.5%, the amounts of the beryllium and silicon varying inversely from the midpoint of the above ranges, for example, 4–4.5% Si—0.1–0.15% Be, 1–2% Si—.2–.3% Be.

The improved results obtained by the invention are more fully illustrated with reference to the various photomicrographs shown in the accompanying drawings in which Figure 1 is a photomicrograph of a specimen coated with 99.9% Al.

Figure 2 is a photomicrograph of a coated ferrous metal specimen using an Al-2% Si coating alloy.

Figure 3 is a photomicrograph using an Al-8% Si coating alloy.

Figure 4 is a photomicrograph of a coated specimen using an Al-0.20% Be coating alloy.

Figure 5 is a photomicrograph of a coated specimen using an Al-0.27% Be coating alloy.

Figure 6:
Figure 6 is a photomicrograph using a 4.16% Si—0.03% Be coating alloy.

All of the coated specimens illustrated in the drawings were mild steel strips coated with the designated alloy or high purity aluminum at the indicated temperatures and immersion times. The specimens were photomicrographed at a magnification of 500 after being subjected to an etch with hydrofluoric acid.

Although the reductions in Fe-Al alloy layer thicknesses may not be directly comparable because of the difference in the indicated coating temperatures and immersion times as between 99.9% Al and Al-Si alloys on the one hand, and Al-Be and Al-Be-Si alloys on the other, the microstructures of the Fe-Al layers are considered very significant.

The Al-Si binary alloy throughout its effective range maintains a single-zoned Fe-Al phase layer, which at 8% or between 4 and 8% penetrates the superimposed aluminum layer and causes a decrease in ductility of the outer layer, thus adversely affecting overall ductility. This is clearly shown in Figure 3.

In Figure 4, it is to be noted that at 0.20% Be in the Al-Be binary there is only a single-zoned layer. However, between 0.20 and 0.27% the layer becomes bi-zoned as shown by Figure 5. It is to be emphasized that the bi-zoned type of structure of such Al-Be alloys was found, in general, to produce more ductile coatings than the single-zoned structure of the Al-Si alloys.

Figure 7:
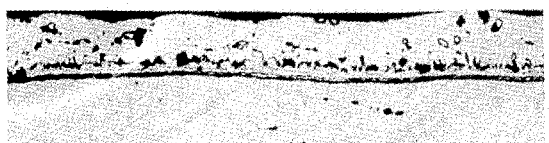
Figure 7 is a photomicrograph using a 3.18% Si—0.10% Be coating alloy.
Figure 8:
Figure 8 is a photomicrograph using a 2.12% Si—0.20% Be coating alloy.
Figure 9:
Figure 9 is a photomicrograph using a 2.28% Si—0.25% Be coating alloy.

Now referring to Figures 5 to 9, inclusive, it may be seen that the bi-zoned structure associated with beryllium occurs at much lower beryllium contents, e.g., 0.03% in the ternary Al-Be-Si alloys of the invention. In other words, the silicon addition apparently advantageously shifts the transition point from single to bi-zoned structure from that observed with Al-Be binaries. Moreover, the bi-zoned structure persists throughout the range of Si-Be contents of the invention, that is, up to high beryllium contents. This factor is believed to explain the higher ductility of the Al-Be-Si alloys, particularly in the lower ranges of beryllium content, as compared to the normal cumulative effect of the silicon and beryllium in reducing the Fe-Al layer thickness. This is decidedly advantageous, from an economic viewpoint, since the advantages of improved bath characteristics and coating appearance are obtainable with beryllium in the lower range of amounts, while the objective of high ductility and adherence, or lack of cracking and spalling tendency is realized.

The compositions of the alloys of the invention may advantageously be varied, the selection of a particular alloy being governed to a large extent by the application for which the composite is intended. For example, where appearance is paramount to ductility, certain alloys exhibit the most desirable properties, while on the other hand, where ductility is a primary factor and appearance of secondary importance, other alloys recommend themselves. In addition, alloys within and without the above-mentioned groups may be most satisfactory for general use considering all factors including ductility, appearance and operational characteristics of the molten alloy coating bath.

In this regard, certain alloying elements in addition to the critical Be-Si combination exert favorable influences depending upon the intended application of the composite. Addition of at least one of the elements zinc, chromium, molybdenum, tungsten, titanium, zirconium and vanadium to Al-Be-Si alloys proved advantageous as to certain properties of the composite.

As noted above, the surface appearance and texture (grain size) of most of the Al-Be-Si alloys were exceptionally good. However, the silicon addition reduced the high lustre of the Al-Be alloy coatings. It was found that additions of zinc in amounts of about 0.5 to 1% by weight of the alloy at least partially restored the lustre, particularly with alloys containing silicon in the higher portion of the range above set forth, and generally improved continuity. The remaining surface characteristics and ductility of the composites were excellent and the operational characteristics of the alloy bath were not adversely affected. The preferred amount of zinc is from 0.6 to 0.75%. Moreover, the zinc addition changed the solution potential of the Al-Be-Si alloys to make them more anodic to the ferrous base metal of the composite in salt solutions and marine environments. This in turn affords added galvanic protection for the basis metal against this type of corrosion.

Additions of small amounts of titanium, zirconium and vanadium singly or combined and with or without zinc, favorably influenced surface appearance by eliminating the large-grained mottled effect of high (0.4% or more) beryllium content. The titanium is used in amounts of from about .05 to 0.15%, while the other two elements are recommended in amount from about 0.1 to 0.25%, the total not exceeding about 0.5%. In addition, these elements, particularly zirconium, were beneficial in increasing the ductility of the coating.

Chromium, molybdenum and tungsten in minor amounts, particularly the first two named elements, employed either singly or collectively, produced advantageous results. The ductility of the Al-Be-Si alloys, particularly in the low Be, high Si range, was noticeably improved. These elements in minor amount with or without addition of zinc slightly improved the lustre of the coatings and/or improved the surface texture thereof, that is, grain size consistency, smoothness, and lack of shrinkage and compound effects. Coverage was also beneficially affected. Accordingly, in certain cases where improved ductility, surface appearance, and texture of the coatings is desired, additions of chromium, molybdenum, and tungsten either singly or in combinations may be made to the Al-Be-Si alloys. These elements are incorporated in amounts of from about 0.1 to 0.35% each when used singly, or up to a total of about 0.50% when collectively used. The preferred range when the elements are added singly is from 0.2 to 0.25%, while this range is the preferred total when two such elements are added.

The beryllium is preferably added to the molten Al bath in the form of a Be-rich aluminum alloy, for example, 5% Be-95% Al, although it may be incorporated in any effective desirable way. The other elements with the exception of zinc are also preferably added as master alloys, for example, an Al-2% Cr, Al-2.5% Mo, Al-2% Zr and Al-4% W alloy. Zinc is most conveniently incorporated as a straight addition to the aluminum alloy melt. Of course, the alloys may be previously prepared and then remelted to form the coating bath.

The aluminum alloys embraced by the invention are aluminum base alloys containing aluminum in amount not substantially less than about 90% by weight, and in most instances, not substantially below about 95%. Other elements such as residual impurities including iron and copper may be present in normal amount, as well as the small amount of additional silicon usually present as a residual. Such elements in these small residual amounts do not exert any substantially adverse effect on the results obtained by the combination of beryllium and silicon with or without the other optionally included additions.

As specific examples illustrating the alloys of the invention, but not constituting a limitation, the following may be mentioned in connection with their outstanding properties and suitability for general purpose applications wherein combined characteristics of ductility and as-coated appearance of the composite, and operational characteristics of the molten bath are all considered:

(1) 0.25% Be—2% Si—0.2% Cr, balance Al
(2) 0.25% Be—2% Si—0.2% Zr, balance Al
(3) 0.2% Be—3% Si—0.1% Mo—0.1% Cr, balance Al
(4) 0.1% Be—4% Si—0.2% Mo—0.5% Zn, balance Al
(5) 0.25% Be—2% Si, balance Al
(6) 0.5% Be—5% Si—0.2% Zr, balance Al
(7) 0.25% Be—2% Si—0.75% Zn, balance Al In utilizing the alloys of the present invention in the hot-dip process various procedural modifications may be employed. Thus, the process may be conducted on either a batch or continuous basis, depending primarily on the nature of the article to be coated. For example, with wire, strip, or sheet, the continuous method is usually employed, whereas with individual work pieces such as castings and the like, the batch process may be preferable. In either case, the coating alloys and molten baths prepared therefrom produce aluminum alloy coated ferrous metal articles superior to similar articles coated with high purity aluminum (99.9%), commercially pure aluminum (2S) and even aluminum containing 5% or more silicon.

The ferrous articles to be coated are first thoroughly cleaned by any suitable method, such as acid pickling to remove oxide film or scale. They may then be rinsed and dried, and immersed in the coating bath with or without the use of a conventional flux. On the other hand, the articles with or without pickling, depending upon the nature of the surface, may be pretreated by bright annealing in suitable apparatus in an inert or reducing atmosphere and then directly immersed in the molten coating bath without exposure to the atmosphere.

The bath temperature is maintained sufficiently high so that the alloys employed are completely molten. Of course, the particular bath temperature depends upon the coating alloy composition and the composition and nature of the ferrous article; and in regard to the alloys herein disclosed temperatures of from about 1280 to about 1375° F. are recommended.

Since thickness of the Fe-Al interfacial layer increases with bath temperature, it is recommended that the lowest operating temperature consistent with good coaing results be used. It is an advantage of the invention, however, that the rate of increase in thickness of the Fe-Al layer with temperature is much lower with the alloys herein disclosed than with pure aluminum.

The time of immersion depends principally upon the composition of the molten bath, the composition and nature of the ferrous article, and the temperature of the molten bath. The immersion time and also the bath temperature may be regulated to produce a composite suitable for the intended application. Extending the time of immersion tends to increase the thickness of the Fe-Al layer and accordingly the shortest immersion times consistent with satisfactory coverage are usually recommended.

As a result of the invention, coating alloys have been developed for aluminum coating of ferrous metal articles whereby composites of excellent appearance, ductility and adherence are produced.

Upon subjecting the composites to 180° bend and spiral wrap tests, the cracking and spalling tendency was found to be greatly reduced compared to high purity or commercially pure aluminum, and even compared to an Al-5% Si coating.

All percentages in the claims are by weight of the total alloy.

I claim:

1. A hot dip coated composite article comprising a base portion of ferrous metal coated with an aluminum base alloy containing from about 0.03 to about 1.5% beryllium, about 1.0 to about 5% silicon, at least one element selected from the group consisting of chromium, molybdenum and tungstein in amount from about 0.1 to 0.35%, the total amount not exceeding about 0.5%, at least one element selected from the group consisting of titanium, zirconium and vanadium in amount from about 0.05 to 0.15% titanium and about 0.1 to 0.25% zirconium and vanadium, the total not exceeding about 0.5%, and from about 0.5 to 1.0% zinc, the balance essentially all aluminum.

2. A hot dip coated composite article comprising a base portion of ferrous metal coated with an aluminum base alloy containing from about 0.03 to about 1.5% beryllium, about 1.0 to about 5% silicon, at least one element selected from the group consisting of chromium, molybdenum and tungsten in amount from about 0.1 to 0.35%, the total amount not exceeding about 0.5%, and at least one element selected from the group consisting of titanium, zirconium and vanadium in amount from about 0.05 to 0.15% titanium and about 0.1 to 0.25% zirconium and vanadium, the total not exceeding about 0.5%, the balance essentially all aluminum.

3. A hot dip coated composite article comprising a base portion of ferrous metal coated with an aluminum base alloy containing from about 0.03 to about 1.5% beryllium, about 1.0 to about 5% silicon, at least one element selected from the group consisting of chromium, molybdenum and tungsten in amount from about 0.1 to 0.35%, the total amount not exceeding about 0.5%, and from about 0.5 to 1.0%, zinc, the aluminum content of said alloy being not substantially less than 90%.

4. A hot dip coated composite article comprising a base portion of ferrous metal coated with an aluminum base alloy containing from about 0.03 to about 1.5% beryllium, about 1.0 to about 5% silicon, at least one element selected from the group consisting of titanium, zirconium and vanadium in amount from about 0.05 to 0.15% titanium and about 0.1 to 0.25% zirconium and vanadium, the total not exceeding about 0.5%, and from about 0.5 to 1.0% zinc, the balance essentially all aluminum.

5. A hot dip coated composite article comprising a base portion of ferrous metal coated with an aluminum base alloy containing from about 0.03 to about 0.7% beryllium, about 1.0 to about 5% silicon, and from about 0.5 to 1.0% zinc, the balance essentially all aluminum.

6. A hot dip coated composite article comprising a base portion of ferrous metal coated with an aluminum base alloy containing from about 0.03 to about 0.7% beryllium, about 1.0 to about 5% silicon, at least one element selected from the group consisting of chromium, molybdenum and tungsten in amount from about 0.1 to 0.35%, the total amount not exceeding about 0.5%, the balance essentially all aluminum.

7. A hot dip coated composite article comprising a base portion of ferrous metal coated with an aluminum base alloy containing from about 0.03 to about 0.7% beryllium, about 1.0 to about 5% silicon, at least one element selected from the group consisting of titanium, zirconium and vanadium in amount from about 0.05 to 0.15% titanium and about 0.1 to 0.25% zirconium and vanadium, the total not exceeding about 0.5%, the balance essentially all aluminum.

8. A hot dip coated composite article comprising a base portion of ferrous metal coated with an aluminum base alloy containing from about 0.03 to about 0.7% beryllium, about 1.0 to about 5% silicon, the balance essentially all aluminum.

9. A hot dip coated composite article comprising a base portion of ferrous metal coated with an aluminum base alloy containing from about 0.03 to about 1.5% beryllium, about 1.0 to about 5% silicon, the balance essentially all aluminum.

References Cited in the file of this patent

UNITED STATES PATENTS

| | | |
|---|---|---|
| 1,792,377 | Jordan | Feb. 10, 1931 |
| 1,879,748 | Horsfeld | Sept. 27, 1932 |
| 2,022,686 | Nock | Dec. 3, 1935 |
| 2,043,855 | Keller | June 9, 1936 |
| 2,406,245 | Oganowski | Aug. 20, 1946 |
| 2,565,768 | Gittings | Aug. 28, 1951 |

FOREIGN PATENTS

| | | |
|---|---|---|
| 159,453 | Swiss | Mar. 16, 1933 |

UNITED STATES PATENT OFFICE
CERTIFICATE OF CORRECTION

Patent No. 2,883,739            April 28, 1959

James B. Russell

It is hereby certified that error appears in the printed specification of the above numbered patent requiring correction and that the said Letters Patent should read as corrected below.

Column 7, line 12, for "coaing" read -- coating --; line 44, for "tungstein" read -- tungsten --; column 8, lines 8 and 9, for "aluminum content of said alloy being not substantially less than 90%." read -- balance essentially all aluminum. --.

Signed and sealed this 30th day of August 1960.

(SEAL)
Attest:

ERNEST W. SWIDER
Attesting Officer

ROBERT C. WATSON
Commissioner of Patents